Oct. 19, 1971    F. N. FOWLER    3,613,268
EDUCATIONAL GAME
Filed Oct. 24, 1969
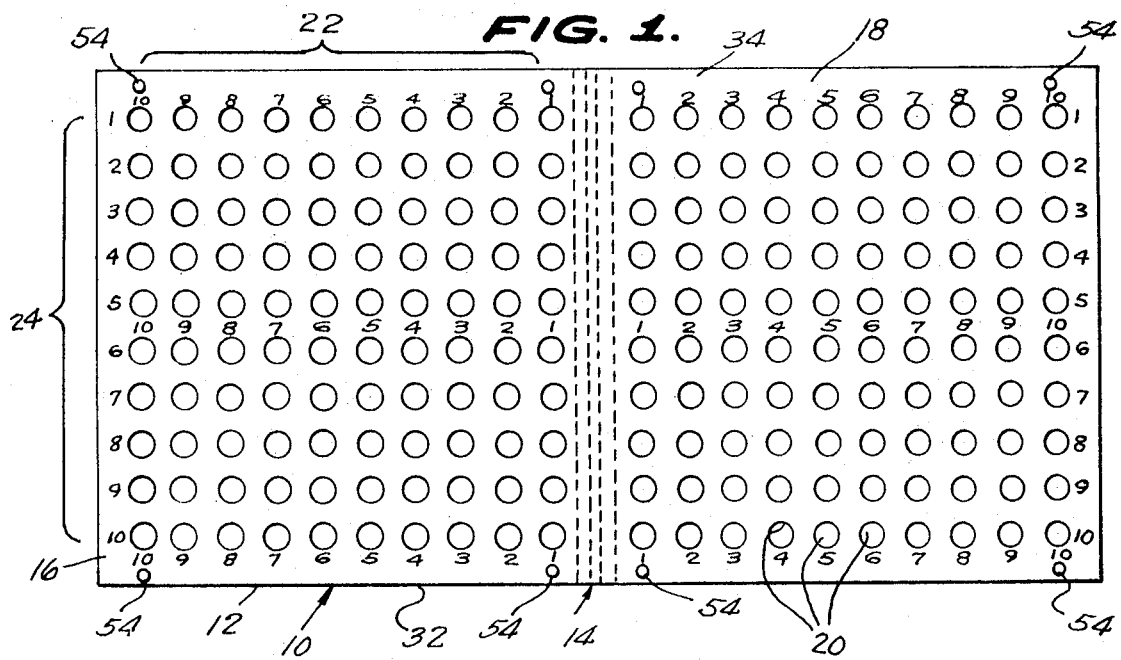
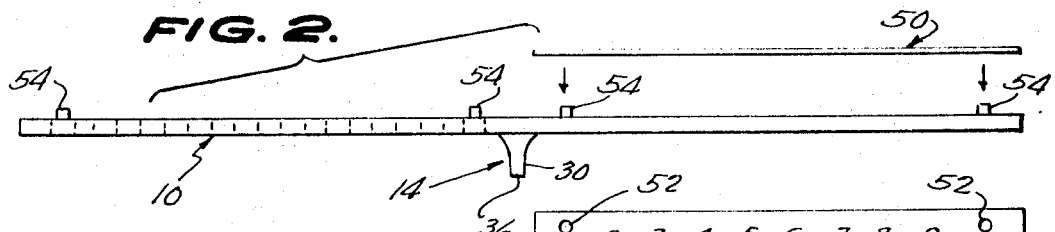
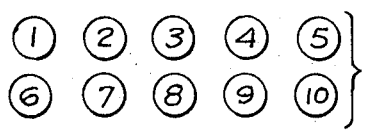
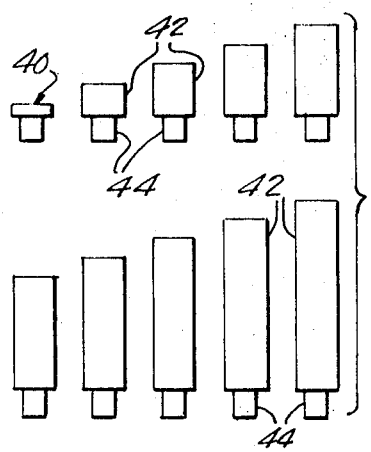
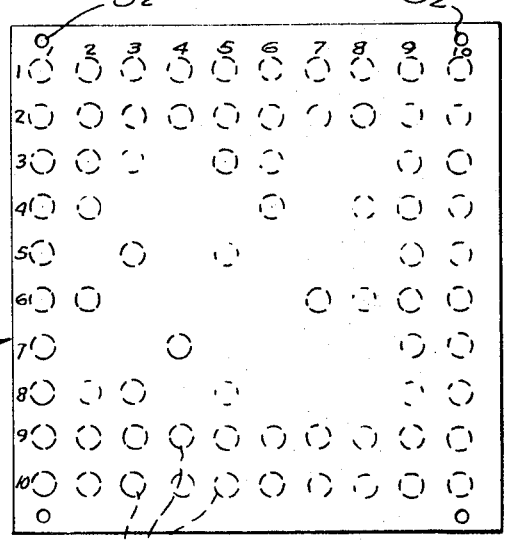
INVENTOR.
FRED N. FOWLER,
BY
Berman, Davidson & Berman,
ATTORNEYS.

United States Patent Office 3,613,268
Patented Oct. 19, 1971

3,613,268
EDUCATIONAL GAME
Fred N. Fowler, 1140 E. Hillsdale B-209,
Foster City, Calif. 94404
Filed Oct. 24, 1969, Ser. No. 869,058
Int. Cl. G09b 19/02
U.S. Cl. 35—31 R                                           3 Claims

ABSTRACT OF THE DISCLOSURE

An educational game useful for the teaching of mathematical concepts and relationships comprising a playing board having a plurality of openings on its upper surface, pivot means secured to the undersurface of said board for balancing same, and pegs of varying predetermined weights insertable in any of the openings. The game involves introducing a problem by unbalancing the board with pegs inserted on one half. The problem is then solved by inserting pegs on the other side in positions which balance the board.

---

This invention relates to games, particularly games providing both pleasurable as well as educational experience for the participants. More specifically, the invention relates to educational devices which are useful in teaching various mathematical relationships and concepts.

As will be generally appreciated, mastering abstract mathematical principles and manipulations pose considerable challenge to a great number of persons, adults as well as children. Basic mathematical exercises such as addition, subtraction, multiplication, division, or the like are for the most part learned by rote, that is, committing to memory the various combination of numbers and procedures necessary to effect a solution.

Children, in their formative years, have been known to experience considerable difficulty with such exercises. Past methods are presently undergoing extensive revisions in order to make the subject more readily understandable and palatable. Past procedures are known to lack imagination and are generally considered to be dull and boring by many of the younger members of our society.

Accordingly, it is a principal object of this invention to provide an educational device having recreational as well as instructional features therein for stimulating the mathematical interests of the participants.

Another object of this invention is to provide an educational game which may be played by either one or more persons.

Still another object of this invention is the provision of effective visual means for recognizing and enforcing basic arithmetic exercises and some basic principles of physics.

Yet another object of this invention is to provide an educational game having a game board which is initially unbalanced when a problem is stated thereon and which requires balancing in order to solve the stated problem.

A further object of this invention is to provide means whereby a participant can automatically record all physical attempts to solve the stated problem.

Yet another object of this invention is to provide an educational device which is inexpensive to manufacture, is of durable, lightweight materials, and capable of mass distribution and wide acceptance.

Further objects and advantages of the invention will become apparent from the following description and claims, as well as the accompanying drawings, wherein:

FIG. 1 is a plan view of a game board with openings therein;

FIG. 2 is a side elevational view of the game board of FIG. 1 showing an analysis card in superposed position immediately prior to placement on the right portion of said board.

FIG. 3 is a plan view of a typical analysis card for use with the game board as shown in FIG. 2;

FIG. 4 illustrates, in elevation, a typical set of pegs insertable in the openings of a game board of FIG. 1; and FIG. 5 is a plan view of the pegs of FIG. 4.

Specifically, this invention contemplates the provision of a balanced game board—similar in principle to a seesaw—wherein the board includes peg-receiving openings on its upper surface arranged in horizontal and vertical rows, and forming a grid pattern across the board. As provided, the board is in a balanced condition, resting on a pivot means secured centrally thereto at its undersurface. A plurality of pegs, provided in sets of ten, are adapted to be inserted in any of the board openings and represent the variable means by which problems are stated, e.g., one player unbalances the board by inserting pegs in certain openings, the other player solves the problem by rebalancing the board using different pegs.

A fundamental rule of the game prohibits the duplication of the moves by the player attempting to rebalance the board. The pattern of pegs inserted for solving a problem must therefore be different than the pattern developed for introducing one problem. Therefore, pegs of different weight are provided, which, in relation to its position on the board or its distance from the fulcrum, offer a variety of alternative solutions to any given problem. For example, a single peg weighing $x$ grams and positioned two inches from the fulcrum can be counterbalanced with one peg weighing $2x$ positioned one inch from the fulcrum on the opposite side thereof. Similarly, four pegs weighing $\frac{1}{2}x$ will also balance the board when oppositely placed one inch from the fulcrum.

Thus, it will be seen that the educational device of this invention offers enumerable possibilities and opportunities for stimulating the mental and visual perception of young children and affords a parent, teacher, counsellor, etc., an opportunity to introduce simple as well as complex mathematics and physics in an interesting and vivid manner.

Referring now to the drawings in detail, wherein like numerals indicate like elements throughout the several views a preferred embodiment of the educational device and indicated as numeral 10 in FIG. 2 comprises a game board 12 having balance or pivot means 14 secured thereto. Game board 12 is of substantially rectangular configuration and formed with identical left and right portions 16 and 18 respectively. A plurality of spaced openings 20 are provided on the upper surface of the board and preferably extending entirely through the board, aligned in vertical columns 22 and horizontal rows 24 forming a grid pattern upon which the play of the game is carred out. Each of portions 16, 18 is shown with ten columns of openings 20 numbered 1–10 across the board starting near the fulcrum and ten rows of openings 20 numbered 1–10 from top to bottom. Such an arrangement is desirable for teaching the advantages of the decimal system; however, other arangements with different numbers of rows or columns may be substituted therefor.

Pivot means 30 representing a fulcrum about which board 12 balances is secured to the undersurface of the board at an approximately transverse center line. Since the board is symmetrically constructed it is in a generally balanced condition, as provided, to be unbalanced and then rebalanced during the play. Although various structural pivot embodiments are contemplated a preferred pivot is shown in FIG. 2 and is an integrally secured wedge-shaped bar member extending transversely between longitudinal edges 32, 34. A flattened bottom edge 36 extending the length thereof aids in balancing the device and provides the added advantage of making the board insensitive to small manufacturing errors in any of the components.

Game 10 also includes a plurality of pegs 40 preferably provided in sets of ten pegs, wherein each peg is weighted differently, increasingly in weight by a predetermined amount or ratio. For example, the weight increase for adjacent pegs may be linear and peg 1 in FIG. 5 representing the smallest and lightest peg in the set may be one-tenth the weight of peg 10 with intermediate pegs directly proportional thereto. Other weight ratios may also be employed; similarly, sets having more than or less than the ten pegs shown may be used. As illustrated in FIG. 4, each of the pegs 40 has a cylindrical upper section or button 42 with a depending cylindrical lower section or stem 44 adapted to be received in board openings 20. The varying button height permits immediate visual recognition of the weight relationship of each peg. Other structures establishing this weight relationship may be provided. For instance, the pegs may all be of the same general size and shape but weighted differently. For example, internally positioned lead weights or the like could be used. Such pegs could be color-coded or marked with numbers similar to those shown in FIG. 5. The pegs may be formed of any suitable material using conventional techniques such as molding, machining, etc. Stem 44 may also be provided with a non-circular cross section; however, the configuration selected should be duplicated in the board to permit ready insertion through the openings.

A plurality of disposable analysis cards are provided for use with the game. A typical card is shown in FIG. 3 and generally indicated by reference numeral 50. Card 50 is preferably square and in use overlays one portion of the game board 12 in a manner shown in FIG. 2. Card alignment means are also included in card 50 as well as board 12 and comprise pin receiving apertures 52 shown in FIG. 3 and raised pins 54 shown in FIG. 2 for insertion in the apertures. Pins 54 spaced apart and positioned adjacent the longitudinal edges 32, 34 near the corners of each portion of the board.

Card 50 is formed of a paper-like material, such as cardboard, with a plurality of perforated circular patterns 56 outlining board openings 20 when superposed thereon and adapted to be punched out each time a peg is inserted during play. By way of example, a series of problems may be given to each participant to be solved in a manner described above. Card 50 is aligned in overlaid position for keeping score. As each problem is worked the moves are automatically recorded in the card as punched holes. Thus, card 50 records all attempts—correct as well as incorrect—to solve the problem. At the completion of the exercise each card is returned to the supervisor, parent, etc. who then compares the card against a master card having the correct answer for the problem stated. A score or grade for that problem is then readily determined by comparing the number of openings in the analysis card to the number in the master.

The educational device of this invention is designed for widespread appeal to persons of all ages and may be economically manufactured for sale at relatively low cost. For example, game board 12 may be molded in one-piece from rigid plastics such as polyvinyl chloride, polyethylene, or the like, with pivot 30 integrally formed thereto.

A typical board size found convenient for carrying and storing is about eight inches long by four inches wide. Various board sizes, shapes, and thicknesses may also be used. Also contemplated are pocket-type receptacles depending from the circular opening wherein differently weighted pegs, discs, or the like are placed therein to execute the necessary moves.

The game may be played as follows:

To solve a problem in addition, integers to be added are placed in a single numbered column on one portion of the board. By placing the appropriately weighted peg in the opposite column the sum is calculated concomitant with balancing the board. For example, to add two and four a number 2 peg and a number 4 peg placed in column 5, rows 7 and 8 will be balanced by a number 6 peg placed in column 5, row 7 of the opposite portion.

For subtraction, the minuend is placed on one portion of the board, e.g., the left portion, the subtrahend or quantity to be subtracted is then placed on the opposite side or right portion; the remainder is calculated by placing the peg in the proper opening on the right portion thereby balancing the board. For example, to subtract two from six, a number 6 peg is placed in left column 5, row 5 and a number 2 peg placed in right column 5, row 5. The board is balanced with a number 4 peg placed in any opening in right column 5.

For multiplication, the multiplier is represented by any of the columns 22, 1–10. The multiplicand is placed in one of the columns by use of a peg. The product is then calculated by placing an appropriate peg on the opposite portion thereby balancing the board. For example, to find the product of two times four, a number 2 peg inserted in right column 2 will be balanced by a number 1 peg inserted in left column 4.

For division, the dividend is represented by a peg inserted in one portion, the divisor is represented by each of the columns shown on the opposite portion. A quotient is calculated by placing the appropriate peg in the proper divisor column until the board is balanced. For example, the quotient of six divided by three may be determined by inserting a number 1 peg in left column 6 and balancing same with a number 2 peg in the divisor or right column 3.

It should be therefore readily apparent that the educational device of the present invention would have wide-ranging appeal and provides educational as well as recreational stimulations to its participants. The game may be played by a single player being given instructions and problems in advance along with self-recording analysis cards. The game may be played with two or more participants, each taking a turn in presenting a problem and then in solving a problem.

While a preferred embodiment of the educational device of this invention has been disclosed in the foregoing description, it should be understood that various modifications within the spirit of the invention may occur to those skilled in the art.

What is claimed is:

1. An educational game useful for teaching mathematical relationships comprising a relatively flat generally rectangular playing board, a rigid pivot bar member secured to the underside of said board centrally thereof along the lateral axis of said board, said pivot bar member projecting below the remaining structure of said board to pivotally support said board on a horizontal surface, the upper face of said board having a plurality of spaced apart rows of bores opening therein with said bores and said rows being equally spaced apart on each side of the lateral axis of said board to form a plurality of columns, said board having an identical number and arrangement of said bores on opposite sides of the lateral axis of said board, playing members including a set of pegs individually insertable in any of said bores in said board, said pegs being provided in predetermined weight-increasing units wherein the weight relationship between successive units in said set is proportional to the spacing between the bores in a direction outwardly from the lateral axis of said board and numbering means on said board for identifying each of said rows and columns of bores in sequence.

2. A game in accordance with claim 1 including a plurality of analysis cards for superposition over a portion of said board, each card having means for recording moves made in the play of the game.

3. A game in accordance with claim 2 including alignment means for overlaying said analysis cards on a portion of said board.

(References on following page)

References Cited

UNITED STATES PATENTS

| | | | |
|---|---|---|---|
| 3,424,455 | 1/1969 | Dunson. | |
| 1,415,278 | 5/1922 | Tod | 35—24 (C) |
| 2,295,818 | 9/1942 | Wistar | 35—48 (A) |
| 2,314,387 | 3/1943 | Carlsson | 35—1 |
| 2,325,488 | 7/1943 | Donovan | 35—24 |
| 2,402,892 | 6/1946 | Hubble | 35—31 |
| 3,212,202 | 10/1965 | Heinichen | 35—31 |
| 3,191,318 | 6/1965 | Hoffmann | 35—73 X |

WILLIAM H. GRIEB, Primary Examiner